US012655288B2

(12) United States Patent
Liu

(10) Patent No.: US 12,655,288 B2
(45) Date of Patent: Jun. 16, 2026

(54) EPOXY RESIN COMPOSITION WITH EPOXY GROUPS AND ACTIVE HYDROGENS HAVING DIFFERENT MOLAR EQUIVALENTS

(71) Applicant: BAMSTONE NEW MATERIAL TECHNOLOGY (WUHAN) CO., LTD., Wuhan (CN)

(72) Inventor: Wei Liu, Wuhan (CN)

(73) Assignee: BAMSTONE NEW MATERIAL TECHNOLOGY (WUHAN) CO., LTD., Wuhan (CN)

( * ) Notice: Subject to any disclaimer, the term of this patent is extended or adjusted under 35 U.S.C. 154(b) by 952 days.

(21) Appl. No.: 17/790,741

(22) PCT Filed: Feb. 8, 2021

(86) PCT No.: PCT/CN2021/075993
§ 371 (c)(1),
(2) Date: Jul. 4, 2022

(87) PCT Pub. No.: WO2022/062306
PCT Pub. Date: Mar. 31, 2022

(65) Prior Publication Data
US 2023/0062899 A1     Mar. 2, 2023

(30) Foreign Application Priority Data
Sep. 28, 2020    (CN) .......................... 202011039094.5

(51) Int. Cl.
*C08L 63/00*         (2006.01)

(52) U.S. Cl.
CPC ........... *C08L 63/00* (2013.01); *C08L 2201/08* (2013.01); *C08L 2205/035* (2013.01)

(58) Field of Classification Search
CPC ...... C08G 59/50; C08G 59/504; C08G 59/56; C08G 59/623; C08G 59/4014; C08L 63/00
See application file for complete search history.

(56) References Cited

U.S. PATENT DOCUMENTS

| | | | |
|---|---|---|---|
| 4,269,742 A | 5/1981 | Goeke et al. | |
| 5,120,817 A | 6/1992 | Speranza et al. | |
| 6,465,601 B1 | 10/2002 | Wiesendanger et al. | |
| 8,735,512 B2 | 5/2014 | Walker et al. | |
| 2021/0221943 A1* | 7/2021 | Behrens ............... | C08G 59/621 |

FOREIGN PATENT DOCUMENTS

| | | | | |
|---|---|---|---|---|
| CN | 102123983 A | | 7/2011 | |
| CN | 102746168 A | * | 10/2012 | |
| CN | 106380785 A | | 2/2017 | |
| CN | 111087761 A | | 5/2020 | |
| CN | 112194778 A | | 1/2021 | |
| WO | WO-2021043728 A1 | * | 3/2021 | ............ C09J 163/04 |

OTHER PUBLICATIONS

Machine translation of CN 102746168 (2012, 6 pages).*
Evonik (Product Information Ancamine K54 Curing Agent, Evonik, Jan. 25, 2022, 2 pages).*

* cited by examiner

*Primary Examiner* — Brieann R Johnston

(74) *Attorney, Agent, or Firm* — Bayramoglu Law Offices, LLC

(57)    ABSTRACT

An epoxy resin composition with epoxy groups and active hydrogens having different molar equivalents includes an epoxy resin component and a curing agent component. A mixing ratio of the epoxy resin component and the curing agent component is a mixing ratio of a cured product with the highest glass transition temperature Tg among cured products with different mixing ratios measured experimentally. According to a weight percentage in a total weight of the epoxy resin component, the epoxy resin component includes: 50 wt % to 100 wt % of a bisphenol A epoxy resin. According to a weight percentage in a total weight of the curing agent component, the curing agent component includes: 60 wt % to 98 wt % of polyetheramine (PEA) and 2 wt % to 20 wt % of a low-viscosity Mannich base.

15 Claims, No Drawings

EPOXY RESIN COMPOSITION WITH EPOXY GROUPS AND ACTIVE HYDROGENS HAVING DIFFERENT MOLAR EQUIVALENTS

CROSS REFERENCE TO THE RELATED APPLICATIONS

This application is the national phase entry of International Application No. PCT/CN2021/075993, filed on Feb. 8, 2021, which is based upon and claims priority to Chinese Patent Application No. 202011039094.5, filed on Sep. 28, 2020, the entire contents of which are incorporated herein by reference.

TECHNICAL FIELD

The present disclosure belongs to the technical field of polymer materials, and relates to an epoxy resin composition with epoxy groups and active hydrogens that have different molar equivalents.

BACKGROUND

Epoxy resins are widely used due to their excellent adhesion, corrosion resistance, heat resistance, and mechanical performance, and are typically used in the fields of coatings, adhesives, and composites. A curable epoxy resin system is generally composed of two components, i.e., an epoxy resin and a curing agent. For curing at medium and low temperatures, an amine compound is generally used as a curing agent component.

When a composite is prepared by a process, such as a vacuum infusion process (VIP) or a resin transfer molding (RTM), it is generally expected that an epoxy resin has a low room-temperature viscosity. Common epoxy resins have a high viscosity and thus are difficult to use directly. Generally, a reactive diluent is added to a general-purpose epoxy resin and then a resulting mixture is mixed with a low-viscosity curing agent to reduce a mixed viscosity of an epoxy resin system. However, the addition of a reactive diluent often compromises the performance of an epoxy resin, especially the heat resistance, which requires the use of a curing agent with excellent heat resistance for compensation.

In addition, when the VIP, RTM, or the like is used to prepare a composite, it is expected that a resin mixture has a long gelation time at room temperature to ensure that the resin can penetrate reinforcing fibers; and meanwhile, it is also expected that the epoxy resin can cure quickly after being properly heated, which are contradictory needs. The above-mentioned curing agent with excellent heat resistance generally refers to an alicyclic amine or an aromatic amine, and such a curing agent exhibits low reactivity with an epoxy resin, which will reduce the later curing speed and degree of the epoxy resin.

The general practice of using an epoxy resin in a manufacturing process of the most typical vacuum infusion composite product (namely, wind turbine blades) is as follows: a bisphenol A epoxy resin is used as an epoxy resin component, and an amount of a diluent, such as 1,4-butanediol diglycidyl ether (BDDE) or 1,6-hexanediol diglycidyl ether (HDDE), is added to reduce a viscosity of the epoxy resin component. Polyetheramine (PEA) with a long gelation time is used as a curing agent component, and an amount of isophorone diamine (IPDA) is added to make up for a loss of heat resistance caused by the addition of the diluent.

However, the use of IPDA results in a high cost, shortens the gelation time of the resin system in the early stage and hinders the improvement of a curing degree in the later stage.

U.S. Pat. No. 4,269,742 discloses the preparation of a Mannich base compound and a use thereof as an epoxy curing agent, and the Mannich base compound can quickly cure an epoxy resin at a low temperature. U.S. Pat. No. 6,465,601 discloses a use of a Mannich base compound as an accelerating agent for epoxy resin and polyurethane (PU) resin systems. U.S. Pat. No. 8,735,512 discloses the preparation and use of a Mannich base compound based on an N,N'-dimethyl secondary diamine polymer. It can be seen from the above that a Mannich base is mainly used as a fast curing agent or an accelerating agent in an epoxy resin system, which generally shortens a gelation time at room temperature and promotes a curing reaction. The use of a Mannich base in an epoxy resin system with slow gelation has not yet been reported. In addition, common Mannich base-type curing agents are synthesized from a diamine or polyamine and usually have a high viscosity, and thus such curing agents can hardly be used in a vacuum infusion or RTM process to produce a composite.

SUMMARY

The problem to be solved by the present disclosure is to provide an epoxy resin composition with epoxy groups and active hydrogens having different molar equivalents. Under the premise of ensuring that a resin system has a low initial mixed viscosity and superior heat resistance and mechanical performance, the present disclosure enables a long gelation time in an early stage and fast and complete curing in a later stage.

To achieve the above objective, the present disclosure adopts the following technical solutions:

An epoxy resin composition with epoxy groups and active hydrogens having different molar equivalents is provided. The composition includes an epoxy resin component and a curing agent component. The mixing ratio of the epoxy resin component and the curing agent component is not a theoretical value calculated based on an epoxy equivalent and an active hydrogen equivalent but is a mixing ratio of a cured product with the highest glass transition temperature Tg among cured products with different mixing ratios measured experimentally.

According to a weight percentage in a total weight of the epoxy resin component, the epoxy resin component includes:

50 wt % to 100 wt % of a bisphenol A epoxy resin.

According to a weight percentage in a total weight of the curing agent component, the curing agent component includes:

60 wt % to 98 wt % of PEA and 2 wt % to 20 wt % of a low-viscosity Mannich base.

Preferably, the epoxy resin composition may have a long gelation time at 25° C. A gelation time of 100 g of the composition in air at this temperature may be greater than 6 h. The epoxy resin composition may have a short gelation time at 60° C., and a gelation time of 50 g or 20 g of the composition in air at this temperature may be less than 1 h.

Preferably, the epoxy resin component may further include 0 wt % to 50 wt % of a bisphenol F epoxy resin.

Preferably, the epoxy resin component may further include 0 wt % to 50 wt % of an epoxy reactive diluent.

More preferably, the epoxy reactive diluent may refer to an epoxy compound with a low viscosity, including, but not limited to, allyl glycidyl ether (AGE), butyl glycidyl ether (BGE), octyl glycidyl ether (OGE), isopropyl glycidyl ether (IGE), phenyl glycidyl ether (PGE), o-cresyl glycidyl ether (CGE), glycidyl methacrylate (GMA), benzyl glycidyl ether, p-tert-butylphenyl glycidyl ether, decyl glycidyl ether, cardanol glycidyl ether, $C_{8-18}$ alkyl glycidyl ether, ethylene glycol diglycidyl ether, propylene glycol diglycidyl ether, poly(ethylene glycol) diglycidyl ether (PEGDE), poly(propylene glycol) diglycidyl ether (PPGDE), BDDE, HDDE, neopentyl glycol diglycidyl ether (NGDE), 1,4-cyclohexanedimethanol diglycidyl ether, cyclohexanediol diglycidyl ether, m/o/p-dihydroxybenzene diglycidyl ether, glycerol triglycidyl ether, trimethylolpropane triglycidyl ether, and 2,3-epoxypropyl neodecanoate, and a combination thereof.

Preferably, the epoxy resin component may further include 0 wt % to 10 wt % of a glycidyl ester, a glycidyl amine, an alicyclic epoxy resin, or a phenolic epoxy resin.

Preferably, the curing agent component may further include 0 wt % to 10 wt % of a monoamine, diamine, or polyamine compound with a primary, secondary, or tertiary amine functional group.

Preferably, the PEA may refer to a polymer in which a main chain is a polyether structure and a terminal active functional group is an amine group. Typical commercial PEA products may include JEFFAMINE® D-230, D-400, and T403 of Huntsman and Baxxodur® EC301, EC302, and EC303 of BASF.

Preferably, the low-viscosity Mannich base may refer to a product that is synthesized by a Mannich reaction of a phenol compound, an amine compound, and an aldehyde compound and has a viscosity of less than 400 mPa·s at 25° C.

More preferably, in the raw materials of the Mannich reaction, a proportion of a monophenol in the phenol compound may be greater than 80 wt %, a proportion of a secondary monoamine in the amine compound may be greater than 80 wt %, and a proportion of formaldehyde in the aldehyde compound may be greater than 80 wt %, which enables a low viscosity.

Preferably, a viscosity of the low-viscosity Mannich base may be measured by a Brookfield DV2TLV rotational viscometer with a 62#rotor at 60 RPM.

The present disclosure has the following beneficial effects:

When an amine is used as a curing agent for an epoxy resin, a mixing ratio of the epoxy resin to the curing agent is generally calculated according to a theoretical ratio of an epoxy equivalent of the epoxy resin to an active hydrogen equivalent of the curing agent, and normally, the number of moles of the active hydrogen is allowed to be equal to or slightly larger than the number of moles of the epoxy group. An excessive amount of the epoxy group generally will reduce the heat resistance and mechanical performance of the epoxy resin system. For example, a common liquid bisphenol A epoxy resin has an epoxy equivalent of 180 to 190, and the Baxxodur® EC301 PEA of BASF has an active hydrogen equivalent of 61. For every 100 parts of epoxy resin, an amount of EC301 added is calculated according to the following formulas:

$$100/180*61=34 \text{ and}$$

$$100/190*61=32.$$

Therefore, for every 100 parts of epoxy resin, 32 to 34 parts of EC301 should be added. Generally, an amine curing agent is allowed to be slightly excessive, and thus 34 parts of an amine curing agent are added.

In the present disclosure, when a mixture of PEA and a low-viscosity Mannich base is used as a curing agent for an epoxy resin, an addition amount of the curing agent is creatively reduced on the basis of a theoretical calculation to make the epoxy group excessive, and a specific ratio is determined based on the highest Tg value of a cured product experimentally measured.

Generally, if the epoxy group is excessive, a crosslinking density of a cured product will be reduced, and thus the heat resistance and mechanical performance of the cured product will be compromised. In a system in which the PEA and low-viscosity Mannich base coexist, due to the presence of the low-viscosity Mannich base, the residual epoxy group further reacts to improve the crosslinking density, such that the heat resistance and mechanical performance of the resin system are improved.

A common Mannich base-type epoxy curing agent is usually synthesized from phenol, formaldehyde, and diethylamine (DEA) (alternatively, dihexylamine, diethylenetriamine, or triethylenetetramine). Because the Mannich base-type epoxy curing agent has a high degree of functionality, the curing agent has a high viscosity and includes many primary and secondary amine groups with abundant active hydrogen. When such a curing agent is used for curing an epoxy resin, it mainly depends on a reaction between the active hydrogen on primary and secondary amine groups and the epoxy resin, and thus a ratio of the active hydrogen to the epoxy resin should be designed to have the same epoxy equivalent and active hydrogen equivalent.

The low-viscosity Mannich base used in the present disclosure is synthesized by a Mannich reaction of a phenol compound, an amine compound, and an aldehyde compound. In order to reduce the viscosity, a monophenol, such as phenol, p/m/o cresol, or p-tert-butylphenol, may be used as the phenol compound; a secondary monoamine, such as dimethylamine (DMA) or DEA, may be used as the amine compound, and a small amount of a primary monoamine or a diamine, such as methylamine, ethylamine, propylamine, DEA, or dihexylamine, can be additionally added; and formaldehyde may be used as the aldehyde compound. A Mannich base product has a low viscosity generally lower than 400 mPa·s (25° C.) and may include tertiary amine groups and phenolic hydroxyl groups as active functional groups, which have less active hydrogen. When the curing agent obtained by compounding the low-viscosity Mannich base and PEA in the present disclosure is used, the epoxy equivalent and the active hydrogen equivalent do not need to be matched. Due to the unpredictability of a chemical reaction of a polymer, the reaction mechanism is unclear. It can only be speculated that a shielding effect of the methyl groups on side chains of PEA makes the reaction between PEA and epoxy resin slow, and some epoxy groups remain; and the residual epoxy groups self-polymerize under the combined action of phenolic hydroxyl groups and tertiary amine groups, thereby increasing the crosslinking density. In addition, the low-viscosity Mannich base of the present disclosure is prepared from readily-available raw materials by a simple process, which results in high economic benefits.

DETAILED DESCRIPTION OF THE EMBODIMENTS

The present disclosure will be further described in detail below through examples. Unless otherwise specified, the term "parts" mentioned in the examples of the present disclosure refers to parts by mass.

Synthesis Example 1

1 mole of phenol and 3.3 moles of DMA were added to a flask, nitrogen was introduced for protection, and a resulting mixture was kept at 40° C. to 50° C. and stirred for 30 min. 3.3 moles of formaldehyde were added, the temperature was raised to 70° C. to 80° C., and a reaction was allowed to occur for 1 h. Water and residual DMA and formaldehyde were removed under vacuum, and the mixture was subjected to a temperature of 120° C. to control the moisture content of the mixture to less than 1% to obtain a product M1. A viscosity of the product was tested to be 180 mPa·s at 25° C.

1 mole of cresol and 3.3 moles of DMA were added to a flask, nitrogen was introduced for protection, and a resulting mixture was kept at 40° C. to 50° C. and stirred for 30 min. 3.3 moles of formaldehyde were added, the temperature was raised to 70° C. to 80° C., and a reaction was allowed to occur for 1 h. Water and residual DMA and formaldehyde were removed under vacuum, and the mixture was subjected to a temperature of 120° C. to control the moisture content of the mixture to less than 1% to obtain a product M2. A viscosity of the product was tested to be 200 mPa·s at 25° C.

1 mole of phenol, 3 moles of DMA, and 0.1 mole of methylamine were added to a flask, nitrogen was introduced for protection, and a resulting mixture was kept at 40° C. to 50° C. and stirred for 30 min. 3.3 moles of formaldehyde were added, the temperature was raised to 70° C. to 80° C., and a reaction was allowed to occur for 1 h; Water and residual DMA and formaldehyde were removed under vacuum, and the mixture was subjected to a temperature was of 120° C. to control the moisture content of the mixture to less than 1% to obtain a product M3. A viscosity of the product was tested to be 280 mPa·s at 25° C.

The viscosity was measured by a Brookfield DV2TLV rotational viscometer with a 62#rotor at 60 RPM.

Example 1

A low-molecular-weight bisphenol A epoxy resin with an epoxy equivalent of 180 to 190 was selected and denoted as E1.

95 parts of Baxxodur EC301 of BASF and 5 parts of M1 were thoroughly mixed, and a resulting mixture was denoted as C1.

92 parts of Baxxodur EC301 of BASF and 8 parts of M1 were thoroughly mixed, and a resulting mixture was denoted as C2.

90 parts of Baxxodur EC301 of BASF and 10 parts of M1 were thoroughly mixed, and a resulting mixture was denoted as C3.

98 parts of Baxxodur EC301 of BASF and 2 parts of M3 were thoroughly mixed, and a resulting mixture was denoted as C4.

60 parts of Baxxodur EC301 of BASF, 20 parts of cyanoethylhexanediamine, and 20 parts of M2 were thoroughly mixed, and a resulting mixture was demoted as C5.

According to the epoxy equivalent and active hydrogen equivalent, theoretical ratios of E1 to C1, C2, C3, C4, and C5 should be 100:35, 100:36, 100:37, 100:34, and 100:40, respectively.

E1 was mixed with each of C1, C2, C3, C4, and C5 in different ratios. Curing was conducted in a 60° C. oven for 2 h. After the temperature in the oven was raised to 80° C., curing was further conducted for 2 h, and a resulting cured product was taken out and tested by differential scanning calorimetry (DSC) for Tg. Test results are shown as follows:

TABLE 1

| | Tg of cured products prepared from mixtures of E1 with C1 to C5 in different ratios in Example 1 | | | | | | |
|---|---|---|---|---|---|---|---|
| No. | E1 | C1 | C2 | C3 | C4 | C5 | Tg (° C.) |
| 1 | 100 | 20 | | | | | 93.9 |
| 2 | 100 | 22 | | | | | 94.8 |
| 3 | 100 | 25 | | | | | 95.9 |
| 4 | 100 | 28 | | | | | 95.8 |
| 5 | 100 | 30 | | | | | 93.0 |
| 6 | 100 | | 20 | | | | 98.2 |
| 7 | 100 | | 22 | | | | 98.4 |
| 8 | 100 | | 25 | | | | 98.0 |
| 9 | 100 | | 28 | | | | 96.1 |
| 10 | 100 | | 30 | | | | 93.7 |
| 11 | 100 | | | 20 | | | 101.3 |
| 12 | 100 | | | 22 | | | 103.4 |
| 13 | 100 | | | 25 | | | 100.0 |
| 14 | 100 | | | 28 | | | 96.5 |
| 15 | 100 | | | 30 | | | 94.1 |
| 16 | 100 | | | | 20 | | 85.9 |
| 17 | 100 | | | | 22 | | 87.4 |
| 18 | 100 | | | | 25 | | 88.6 |
| 19 | 100 | | | | 28 | | 89.9 |
| 20 | 100 | | | | 30 | | 88.5 |
| 21 | 100 | | | | | 20 | 103.5 |
| 22 | 100 | | | | | 22 | 105.3 |
| 23 | 100 | | | | | 25 | 102.1 |
| 24 | 100 | | | | | 28 | 98.2 |
| 25 | 100 | | | | | 30 | 96.5 |

Under the same curing conditions, the following can be concluded. Among mixtures of E1 and C1, a mixture of E1 and C1 in a ratio of 100:25 leads to a cured product with the highest Tg (95.9° C.). Among mixtures of E1 and C2, a mixture of E1 and C2 in a ratio of 100:22 leads to a cured product with the highest Tg (98.4° C.). Among mixtures of E1 and C3, a mixture of E1 and C3 in a ratio of 100:22 leads to a cured product with the highest Tg (103.4° C.). Among mixtures of E1 and C4, a mixture of E1 and C4 in a ratio of 100:28 leads to a cured product with the highest Tg (89.9° C.). Among mixtures of E1 and C5, a mixture of E1 and C5 in a ratio of 100:22 leads to a cured product with the highest Tg (105.3° C.). These optimal ratios deviate significantly from the theoretical values calculated based on the epoxy equivalent and active hydrogen equivalent, and an amount of the curing agent used is lower than the theoretical value.

Example 2

85 parts of a low-molecular-weight bisphenol A epoxy resin with an epoxy equivalent of 180 to 190 and 15 parts of BDDE were thoroughly mixed, and a resulting mixture was denoted as E2.

85 parts of a low-molecular-weight bisphenol A epoxy resin with an epoxy equivalent of 180 to 190 and 15 parts of HDDE were thoroughly mixed, and a resulting mixture was denoted as E3.

85 parts of a low-molecular-weight bisphenol A epoxy resin with an epoxy equivalent of 180 to 190 and 15 parts of NGDE were thoroughly mixed, and a resulting mixture was denoted as E4.

95 parts of Baxxodur® EC301 of BASF and 5 parts of M1 were thoroughly mixed, and a resulting mixture was denoted as C1.

According to the epoxy equivalent and active hydrogen equivalent, theoretical ratios of E2, E3, and E4 to C1 should be 100:36, 100:36, and 100:36, respectively.

E2, E3, and E4 were each mixed with C1 in different ratios. Curing was conducted in a 60° C. oven for 2 h. After the temperature in the oven was raised to 80° C., curing was further conducted for 2 h, and a resulting cured product was taken out and tested by DSC for Tg. Test results are shown as follows:

TABLE 2

| Tg of cured products prepared from mixtures of E2, E3, and E4 with C1 in different ratios in Example 2 | | | | | |
|---|---|---|---|---|---|
| No. | E2 | E3 | E4 | C1 | Tg (° C.) |
| 1 | 100 | | | 24 | 86.0 |
| 2 | 100 | | | 25 | 88.1 |
| 3 | 100 | | | 26 | 87.7 |
| 4 | 100 | | | 27 | 86.0 |
| 5 | 100 | | | 28 | 84.8 |
| 6 | | 100 | | 24 | 84.2 |
| 7 | | 100 | | 25 | 85.9 |
| 8 | | 100 | | 26 | 84.7 |
| 9 | | 100 | | 27 | 83.9 |
| 10 | | 100 | | 28 | 83.0 |
| 11 | | | 100 | 24 | 85.5 |
| 12 | | | 100 | 25 | 86.5 |
| 13 | | | 100 | 26 | 85.2 |
| 14 | | | 100 | 27 | 85.1 |
| 15 | | | 100 | 28 | 84.3 |

Under the same curing conditions, the following can be concluded. Among mixtures of E2 and C1, a mixture of E2 and C1 in a ratio of 100:25 leads to a cured product with the highest Tg (88.1° C.). Among mixtures of E3 and C1, a mixture of E3 and C1 in a ratio of 100:25 leads to a cured product with the highest Tg (85.9° C.). Among mixtures of E4 and C1, a mixture of E4 and C1 in a ratio of 100:25 leads to a cured product with the highest Tg (86.5° C.). After the reactive diluent is added to the bisphenol A epoxy resin, these optimal ratios still deviate significantly from the theoretical values calculated based on the epoxy equivalent and active hydrogen equivalent, and the amount of the curing agent used is lower than the theoretical value. In addition, it can be seen that the change of the amount of the curing agent within a specified range has a small impact on Tg.

Example 3

75 parts of a low-molecular-weight bisphenol A epoxy resin with an epoxy equivalent of 180 to 190, 5 parts of a low-molecular-weight bisphenol F epoxy resin with an epoxy equivalent of 165 to 175, and 20 parts of 1,4-dimethylcyclohexanediol diglycidyl ether were thoroughly mixed, and a resulting mixture was denoted as E5.

90 parts of a low-molecular-weight bisphenol A epoxy resin with an epoxy equivalent of 180 to 190 and 10 parts of PGE were thoroughly mixed, and a resulting mixture was denoted as E6.

50 parts of a low-molecular-weight bisphenol A epoxy resin with an epoxy equivalent of 180 to 190 and 50 parts of a low-molecular-weight bisphenol F epoxy resin with an epoxy equivalent of 165 to 175 were thoroughly mixed, and a resulting mixture was denoted as E7.

95 parts of Baxxodur EC301 of BASF and 5 parts of M1 were thoroughly mixed, and a resulting mixture was denoted as C1.

According to the epoxy equivalent and active hydrogen equivalent, theoretical ratios of E5, E6, and E7 to C1 should be 100:35, 100:36, and 100:37, respectively.

E5, E6, and E7 were each mixed with C1 in different ratios. Curing was conducted in a 60° C. oven for 2 h. After the temperature in the oven was raised to 80° C., curing was further conducted for 2 h, and a resulting cured product was taken out and tested by DSC for Tg. Test results are shown as follows:

TABLE 3

| Tg of cured products prepared from mixtures of E5, E6, and E7 with C1 in different ratios in Example 3 | | | | | |
|---|---|---|---|---|---|
| No. | E5 | E6 | E7 | C1 | Tg (° C.) |
| 1 | 100 | | | 22 | 86.1 |
| 2 | 100 | | | 24 | 88.2 |
| 3 | 100 | | | 26 | 87.1 |
| 4 | 100 | | | 28 | 85.4 |
| 5 | 100 | | | 30 | 84.6 |
| 6 | | 100 | | 22 | 86.0 |
| 7 | | 100 | | 24 | 88.8 |
| 8 | | 100 | | 26 | 86.8 |
| 9 | | 100 | | 28 | 84.6 |
| 10 | | 100 | | 30 | 82.7 |
| 11 | | | 100 | 22 | 84.7 |
| 12 | | | 100 | 24 | 87.1 |
| 13 | | | 100 | 26 | 89.5 |
| 14 | | | 100 | 28 | 88.0 |
| 15 | | | 100 | 30 | 86.0 |

Under the same curing conditions, the following can be concluded. Among mixtures of E5 and C1, a mixture of E5 and C1 in a ratio of 100:24 leads to a cured product with the highest Tg (88.2° C.). Among mixtures of E6 and C1, a mixture of E6 and C1 in a ratio of 100:24 leads to a cured product with the highest Tg (88.8° C.). Among mixtures of E7 and C1, a mixture of E7 and C1 in a ratio of 100:26 leads to a cured product with the highest Tg (89.5° C.). After the composition and proportion of the epoxy resin component are further changed, these optimal ratios still deviate significantly from the theoretical values calculated based on the epoxy equivalent and active hydrogen equivalent, and an amount of the curing agent used is lower than the theoretical value. In addition, it can be seen that the change of the amount of the curing agent within a specified range has a small impact on Tg.

Example 4

A low-molecular-weight bisphenol A epoxy resin with an epoxy equivalent of 180 to 190 was selected and denoted as E1.

90 parts of Baxxodur EC301 of BASF and 10 parts of M1 were thoroughly mixed, and a resulting mixture was denoted as C3.

According to the epoxy equivalent and active hydrogen equivalent, a theoretical ratio of E1 to C3 should be 100:37.

E1 was mixed with C3 in different ratios. Curing was conducted in an 80° C. oven for 1 h. After the temperature in the oven was raised to 120° C., curing was further conducted for 1 h, and a resulting cured product was taken out and tested by DSC for Tg. Test results are shown as follows:

TABLE 4

| Tg of cured products prepared from mixtures of E1 and C3 in different ratios in Example 4 | | | |
|---|---|---|---|
| No. | E1 | C3 | Tg (° C.) |
| 1 | 100 | 17 | 111.4 |
| 2 | 100 | 18 | 111.5 |

TABLE 4-continued

Tg of cured products prepared from mixtures
of E1 and C3 in different ratios in Example 4

| No. | E1 | C3 | Tg (° C.) |
|---|---|---|---|
| 3 | 100 | 19 | 111.3 |
| 4 | 100 | 20 | 112.8 |
| 5 | 100 | 21 | 108.8 |
| 6 | 100 | 22 | 106.7 |
| 7 | 100 | 23 | 105.6 |
| 8 | 100 | 24 | 104.6 |
| 9 | 100 | 25 | 102.1 |
| 10 | 100 | 26 | 100.4 |

It can be seen that, after the curing conditions are changed as compared to Examples 1-3, among the mixtures of E1 and C3, a mixture of E1 and C3 in a ratio of 100:20 leads to a cured product with the highest Tg (112.8° C.). After the curing conditions are changed, these optimal ratios still deviate significantly from the theoretical values calculated based on the epoxy equivalent and active hydrogen equivalent, and an amount of the curing agent used is lower than the theoretical value. In addition, it can be seen from the comparison with Example 1 that the higher the curing temperature, the lower the amount of the curing agent required for the optimal ratio.

Example 5

85 parts of a low-molecular-weight bisphenol A epoxy resin with an epoxy equivalent of 180 to 190 and 15 parts of BDDE were thoroughly mixed, and a resulting mixture was denoted as E2.

95 parts of Baxxodur EC301 of BASF and 5 parts of M1 were thoroughly mixed, and a resulting mixture was denoted as C1.

E2 and C1 were mixed in a ratio of 100:25, and a resulting mixture was cured under different conditions. Resulting cured products were tested for Tg, and test results are shown as follows:

TABLE 5

Tg of cured products obtained by curing the mixture
of E2 and C1 under different conditions in Example 5

| No. | Curing conditions | Tg (° C.) |
|---|---|---|
| 1 | 60° C. 2 h + 70° C. 1 h | 74.9 |
| 2 | 60° C. 2 h + 70° C. 2 h | 79.0 |
| 3 | 60° C. 2 h + 80° C. 1 h | 82.9 |
| 4 | 60° C. 2 h + 80° C. 2 h | 86.2 |

It can be seen that, when E2 and C1 are mixed in the same ratio, the higher the curing temperature or the longer the curing time, the higher the Tg (86.2° C.). No. 4 in this example and No. 2 in Example 2 are experiments in different batches under the same conditions, and a certain deviation exists, which is within an allowable range of deviation.

Example 6

A low-molecular-weight bisphenol A epoxy resin with an epoxy equivalent of 180 to 190 was selected and denoted as E1.

85 parts of a low-molecular-weight bisphenol A epoxy resin with an epoxy equivalent of 180 to 190 and 15 parts of BDDE were thoroughly mixed, and a resulting mixture was denoted as E2.

85 parts of a low-molecular-weight bisphenol A epoxy resin with an epoxy equivalent of 180 to 190 and 15 parts of HDDE were thoroughly mixed, and a resulting mixture was denoted as E3.

85 parts of a low-molecular-weight bisphenol A epoxy resin with an epoxy equivalent of 180 to 190 and 15 parts of NGDE were thoroughly mixed, and a resulting mixture was denoted as E4.

95 parts of Baxxodur EC301 of BASF and 5 parts of M1 were thoroughly mixed, and a resulting mixture was denoted as C1.

90 parts of Baxxodur EC301 of BASF and 10 parts of M1 were thoroughly mixed, and a resulting mixture was denoted as C3.

E2 and C1 were thoroughly mixed in a ratio of 100:25, and the resulting mixture was denoted as H1. In H1, a molar ratio of the epoxy group to the active hydrogen was equal to 1.4. An initial viscosity of H1 at 25° C. was measured to be 250 mPa·s.

E3 and C1 were thoroughly mixed in a ratio of 100:25, and the resulting mixture was denoted as H2. In H2, a molar ratio of the epoxy group to the active hydrogen was equal to 1.4. An initial viscosity of H2 at 25° C. was measured to be 250 mPa·s.

E4 and C1 were thoroughly mixed in a ratio of 100:25, and the resulting mixture was denoted as H3. In H3, a molar ratio of the epoxy group to the active hydrogen was equal to 1.4. An initial viscosity of H3 at 25° C. was measured to be 330 mPa·s.

E1 and C3 were thoroughly mixed in a ratio of 100:22, and the resulting mixture was denoted as H4. In H4, a molar ratio of the epoxy group to the active hydrogen was equal to 1.7. An initial viscosity of H4 at 25° C. was measured to be 830 mPa·s.

100 g of each of H1, H2, H3, and H4 was weighed, and a gelation time thereof at 25° C. was tested. Test results are shown as follows:

TABLE 6

Gelation time of 100 g of each of H1,
H2, H3, and H4 at 25° C. in Example 6

| No. | Sample | Weight (g) | Temperature (° C.) | Gelation time (h) |
|---|---|---|---|---|
| 1 | H1 | 100 | 25 | >8 |
| 2 | H2 | 100 | 25 | >8 |
| 3 | H3 | 100 | 25 | >8 |
| 4 | H4 | 100 | 25 | 7.5 |

Different weights of H1 were weighed, and gelation times thereof at 50° C. and 60° C. were tested. Test results are shown as follows:

TABLE 7

Gelation times of different weights of H1
at different temperatures in Example 6

| No. | Sample | Weight (g) | Temperature (° C.) | Gelation time (h) |
|---|---|---|---|---|
| 1 | H1 | 50 | 50 | 1.13 |
| 2 | H1 | 50 | 60 | 0.70 |
| 3 | H1 | 20 | 50 | 2.33 |
| 4 | H1 | 20 | 60 | 0.9 |

It can be seen that 100 g of the epoxy resin composition prepared in the above example has a gelation time of greater than 6 h in air at 25° C.; and 50 g and 20 g of the epoxy resin composition both have a gelation time of less than 1 h in air at 60° C.

Comparative Example 1

A low-molecular-weight bisphenol A epoxy resin with an epoxy equivalent of 180 to 190 was selected and denoted as E1.

100 parts of E1 and 34 parts of Baxxodur EC301 of BASF were weighed and thoroughly mixed, and a resulting mixture was denoted as D1. In D1, a molar ratio of the epoxy group to the active hydrogen was equal to 0.99. An initial viscosity of D1 at 25° C. was measured to be 720 mPa·s.

100 g of the mixture D1 was taken for testing and had a gelation time of greater than 8 h at 25° C.

50 g of D1 was taken and cured in a 60° C. oven for 2 h. After the temperature in the oven was raised to 80° C., the curing was further conducted for 2 h, and a resulting cured product was taken out and tested by DSC for Tg, which was 83.9° C.

Comparative Example 2

A low-molecular-weight bisphenol A epoxy resin with an epoxy equivalent of 180 to 190 was selected and denoted as E1.

100 parts of E1, 34 parts of Baxxodur EC301 of BASF, and 2 parts of M1 were weighed and thoroughly mixed, and a resulting mixture was denoted as D2. In D2, a molar ratio of the epoxy group to the active hydrogen was equal to 0.99.

100 g of the mixture D2 was taken for testing and had a gelation time of 7 h at 25° C.

50 g of D2 was taken and cured in a 60° C. oven for 2 h. After the temperature in the oven was raised to 80° C., the curing was further conducted for 2 h, and a resulting cured product was taken out and tested using DSC for Tg, which was 83.4° C.

Comparative Example 3

85 parts of a low-molecular-weight bisphenol A epoxy resin with an epoxy equivalent of 180 to 190 and 15 parts of BDDE were thoroughly mixed, and a resulting mixture was denoted as E2.

100 parts of E2, 35 parts of Baxxodur EC301 of BASF, and 2 parts of M1 were weighed and thoroughly mixed, and a resulting mixture was denoted as D3. In D3, a molar ratio of the epoxy group to the active hydrogen was equal to 0.99.

100 g of the mixture D3 was taken for testing and had a gelation time of 7 h at 25° C.

50 g of D3 was taken and cured in a 60° C. oven for 2 h. After the temperature in the oven was raised to 80° C., the curing was further conducted for 2 h, and a resulting cured product was taken out and tested by DSC for Tg, which was 71.6° C.

Comparative Example 4

85 parts of a low-molecular-weight bisphenol A epoxy resin with an epoxy equivalent of 180 to 190 and 15 parts of BDDE were thoroughly mixed, and a resulting mixture was denoted as E2.

100 parts of E2, 26 parts of Baxxodur EC301 of BASF, and 7 parts of IPDA were weighed and thoroughly mixed, and a resulting mixture was denoted as D4. In D4, a molar ratio of the epoxy group to the active hydrogen was equal to 0.99.

100 g of the mixture D4 was taken for testing and had a gelation time of 8 h at 25° C.

50 g of D4 was taken and cured in a 60° C. oven for 2 h. After the temperature in the oven was raised to 80° C., the curing was further conducted for 2 h, and a resulting cured product was taken out and tested by DSC for Tg, which was 74.1° C.

Comparative Example 5

85 parts of a low-molecular-weight bisphenol A epoxy resin with an epoxy equivalent of 180 to 190 and 15 parts of BDDE were thoroughly mixed, and a resulting mixture was denoted as E2.

100 parts of E2 and 35 parts of Baxxodur EC301 of BASF were weighed and thoroughly mixed, and a resulting mixture was denoted as D5. In D5, a molar ratio of the epoxy group to the active hydrogen was equal to 0.99.

100 g of the mixture D5 was taken for testing and had a gelation time of greater than 8 h at 25° C.

50 g of D4 was taken and cured in a 60° C. oven for 2 h. After the temperature in the oven was raised to 80° C., the curing was further conducted for 2 h, and a resulting cured product was taken out and tested by DSC for Tg, which was 66.5° C.

The results of Comparative Examples 1 to 5 were shown in Table 8.

TABLE 8

| | Gelation time at 25° C. and cured product Tg of D1 to D5 in Comparative Examples 1 to 5 | | | | |
|---|---|---|---|---|---|
| No. | Sample | Weight (g) | Temperature (° C.) | Gelation time (h) | Tg (° C.) |
| 1 | D1 | 100 | 25 | >8 | 83.9 |
| 2 | D2 | 100 | 25 | 7 | 83.4 |
| 3 | D3 | 100 | 25 | 7 | 71.6 |
| 4 | D4 | 100 | 25 | 8 | 74.1 |
| 5 | D5 | 100 | 25 | >8 | 66.5 |

It can be seen from the above comparative examples and examples that, when the reactive diluent is added to the bisphenol A epoxy resin to reduce the viscosity of the system, the Tg is significantly reduced (Comparative Example D5 vs D1). Compared with the case where no IPDA is added (Comparative Example D5), the addition of IPDA with prominent heat resistance to replace a part of the PEA (Comparative Example D4) shortens the gelation time and can slightly improve the Tg of a cured product of the system.

When a low-viscosity Mannich base is added to an epoxy resin system of an epoxy resin and a PEA curing agent, if a mixing ratio of the two components is used with the epoxy equivalent and active hydrogen equivalent matched (samples D2 and D3 in Comparative Examples 2 and 3), the Mannich base will catalyze the reaction between the PEA and epoxy resin and the gelation time will be shortened. If a mixing ratio of the two components is used without the epoxy equivalent and the active hydrogen equivalent being matched (samples H1, H2, H3, and H4 in Example 6), the gelation time will affected insignificantly.

In addition, when a low-viscosity Mannich base is added to an epoxy resin system of an epoxy resin and a PEA curing agent, if a mixing ratio of the two components is used with the epoxy equivalent and active hydrogen equivalent matched, the Tg of the cured product will not change much (samples D1 and D2 in Comparative Examples 1 and 2). If a mixing ratio of the two components is used without the epoxy equivalent and the active hydrogen equivalent being matched, the Tg of the cured product will be significantly increased (comparison between sample D1 in Comparative Example 1 and Example 1; and comparison between sample D5 in Comparative Example 5 and Example 2).

In summary, the epoxy resin system with epoxy groups and active hydrogens having different molar equivalents in the present disclosure has a small impact on the gelation time at room temperature, has a high curing speed after being heated, can improve the Tg of a cured product, and can reduce a viscosity of a product. In addition, the low-viscosity Mannich base of the present disclosure is prepared from readily-available raw materials by a simple process, which results in high economic benefits.

What is claimed is:

1. An epoxy resin composition with epoxy groups and active hydrogens having different molar equivalents, comprising an epoxy resin component and a curing agent component, wherein a mixing ratio of the epoxy resin component and the curing agent component is not a theoretical value calculated based on an epoxy equivalent and an active hydrogen equivalent, and the mixing ratio of the epoxy resin component and the curing agent component is a mixing ratio of a cured product with a maximum glass transition temperature Tg among cured products with different mixing ratios measured experimentally;

according to a weight percentage in a total weight of the epoxy resin component, the epoxy resin component comprises:

50 wt % to 100 wt % of a bisphenol A epoxy resin; and according to a weight percentage in a total weight of the curing agent component, the curing agent component comprises:

60 wt % to 98 wt % of polyetheramine (PEA) and 2 wt % to 20 wt % of a Mannich base having a viscosity of less than 400 mPa·s at 25° C.;

wherein a molar ratio of epoxy groups to active hydrogens in the mixture of the epoxy resin component and the curing agent component at said mixing ratio of a cured product with a maximum glass transition temperature Tg is 1.7.

2. The epoxy resin composition according to claim 1, wherein the epoxy resin component further comprises 0 wt % to 50 wt % of a bisphenol F epoxy resin.

3. The epoxy resin composition according to claim 1, wherein the epoxy resin component further comprises 0 wt % to 50 wt % of an epoxy reactive diluent.

4. The epoxy resin composition according to claim 3, wherein the epoxy reactive diluent is selected from the group consisting of at least one of allyl glycidyl ether (AGE), butyl glycidyl ether (BGE), octyl glycidyl ether (OGE), isopropyl glycidyl ether (IGE), phenyl glycidyl ether (PGE), o-cresyl glycidyl ether (CGE), glycidyl methacrylate (GMA), benzyl glycidyl ether, p-tert-butylphenyl glycidyl ether, decyl glycidyl ether, cardanol glycidyl ether, $C_{8-18}$ alkyl glycidyl ether, ethylene glycol diglycidyl ether, propylene glycol diglycidyl ether, poly(ethylene glycol) diglycidyl ether (PEGDE), poly(propylene glycol) diglycidyl ether (PPGDE), 1,4-butanediol diglycidyl ether (BDDE), 1,6-hexanediol diglycidyl ether (HDDE), neopentyl glycol diglycidyl ether (NGDE), 1,4-cyclohexanedimethanol diglycidyl ether, cyclohexanediol diglycidyl ether, m/o/p-dihydroxybenzene diglycidyl ether, glycerol triglycidyl ether, trimethylolpropane triglycidyl ether, and 2,3-epoxypropyl neodecanoate.

5. The epoxy resin composition according to claim 1, wherein the epoxy resin component further comprises 0 wt % to 10 wt % of a glycidyl ester, a glycidyl amine, an alicyclic epoxy resin, or a phenolic epoxy resin.

6. The epoxy resin composition according to claim 1, wherein the curing agent component further comprises 0 wt % to 10 wt % of a monoamine, diamine, or polyamine compound with a primary, secondary, or tertiary amine functional group.

7. The epoxy resin composition according to claim 1, wherein the Mannich base is synthesized by a Mannich reaction of a phenol compound, an amine compound, and an aldehyde compound.

8. The epoxy resin composition according to claim 7, wherein in raw materials of the Mannich reaction, a proportion of a monophenol in the phenol compound is greater than 80 wt %, a proportion of a secondary monoamine in the amine compound is greater than 80 wt %, and a proportion of formaldehyde in the aldehyde compound is greater than 80 wt %.

9. The epoxy resin composition according to claim 7, wherein a viscosity of the Mannich base is measured by a Brookfield DV2TLV rotational viscometer with a 62 #rotor at 60 RPM.

10. The epoxy resin composition according to claim 2, wherein the epoxy resin component further comprises 0 wt % to 50 wt % of an epoxy reactive diluent.

11. The epoxy resin composition according to claim 2, wherein the epoxy resin component further comprises 0 wt % to 10 wt % of a glycidyl ester, a glycidyl amine, an alicyclic epoxy resin, or a phenolic epoxy resin.

12. The epoxy resin composition according to claim 3, wherein the epoxy resin component further comprises 0 wt % to 10 wt % of a glycidyl ester, a glycidyl amine, an alicyclic epoxy resin, or a phenolic epoxy resin.

13. The epoxy resin composition according to claim 2, wherein the curing agent component further comprises 0 wt % to 10 wt % of a monoamine, diamine, or polyamine compound with a primary, secondary, or tertiary amine functional group.

14. The epoxy resin composition according to claim 3, wherein the curing agent component further comprises 0 wt % to 10 wt % of a monoamine, diamine, or polyamine compound with a primary, secondary, or tertiary amine functional group.

15. The epoxy resin composition according to claim 5, wherein the curing agent component further comprises 0 wt % to 10 wt % of a monoamine, diamine, or polyamine compound with a primary, secondary, or tertiary amine functional group.

* * * * *